(12) United States Patent
Wu et al.

(10) Patent No.: US 6,415,503 B1
(45) Date of Patent: Jul. 9, 2002

(54) ASSEMBLING SYSTEM OF RUBBER CONES OF COMPUTER KEYBOARDS

(75) Inventors: Martin Wu; Jerry Lin, both of Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/732,304

(22) Filed: Dec. 8, 2000

(51) Int. Cl.$^7$ .......................... B23P 19/00; B23P 19/02; B23P 19/04; B23P 3/00
(52) U.S. Cl. ..................... 29/821; 29/760; 29/235; 29/240; 29/464
(58) Field of Search .................. 29/404, 821, 700, 29/760, 235, 240, 281.5

(56) References Cited

U.S. PATENT DOCUMENTS 5,431,332 A * 7/1995 Kirby et al. ................ 228/246

FOREIGN PATENT DOCUMENTS

JP 363020018 * 1/1988

* cited by examiner

Primary Examiner—P. W. Echols
Assistant Examiner—John C. Hong
(74) Attorney, Agent, or Firm—Rosenberg, Klein & Lee (57) ABSTRACT

The present invention provides an assembling system of rubber cones of computer keyboards and an assembling method for the same. The assembling system of rubber cones of computer keyboards of the present invention comprises an assembly housing, a moldboard stage, a rocking apparatus, and a rotating apparatus. The assembly housing has an operational space. The moldboard stage has a plurality of moldboards, and is arranged above the operational space of the assembly housing. Each moldboard corresponds to a keyboard to be assembled, and has a plurality of recesses corresponding to key switches of the keyboard on the surface thereof. The rocking apparatus and the rotating apparatus join with the moldboard stage at two sides thereof to provide required rocking and rotating forces for the moldboard. Thereby, the present invention can partly automate the originally wholly-artificial assembling method, increase the assembly efficiency, and reduce the cost of manpower.

6 Claims, 9 Drawing Sheets

RUBBER CONES ARE PLACED ON THE MOLDBOARDS

THE ROCKING APPARATUS AND THE ROTATING APPARATUS ARE ACTIVATED TO APPLY A ROCKING FORCE AND A ROTATING FORCE TO THE MOLDBOARDS SO THAT THE RUBBER CONES CAN FALL INTO THE RECESSES OF THE MOLDBOARDS

FIG.9

ASSEMBLING SYSTEM OF RUBBER CONES OF COMPUTER KEYBOARDS

FIELD OF THE INVENTION

The present invention relates to an assembling system of rubber cones of computer keyboards and an assembling method for the same and, more particularly, to an assembling system of rubber cones of notebook computer keyboards and an assembling method for the same.

BACKGROUND OF THE INVENTION

Figure 1:
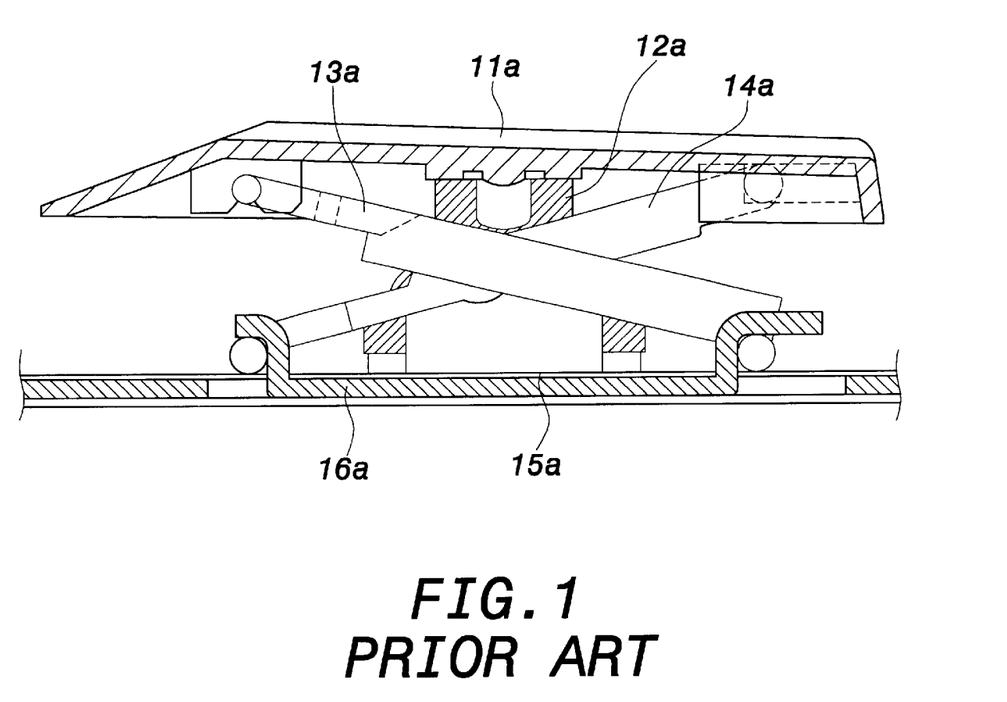
FIG. 1 is a side view of a key switch of a prior art notebook computer keyboard.

As shown in FIG. 1, a key switch of a prior art computer keyboard comprises a key top 11a, a rubber cone 12a, two levers 13a and 14a in scissors arrangement, a circuit board 15a, and a base 16a. The top ends of the two levers 13a and 14a are connected to the bottom pier of the key top 11a, and the bottom ends thereof are fastened to the base 16a. The rubber cone 12a is arranged between the key top 11a and the base 16a. Tie circuit board 15a is spread over the surface of tile base 16a so that a contact can be formed on the circuit board 15a when the key top 11a and the rubber cone 12a are pressed.

Therefore, how to arrange the rubber cones 12a on predetermined positions on the circuit board 15a accurately and quickly in the procedure of assembling keyboards is a very important problem.

Figure 2:
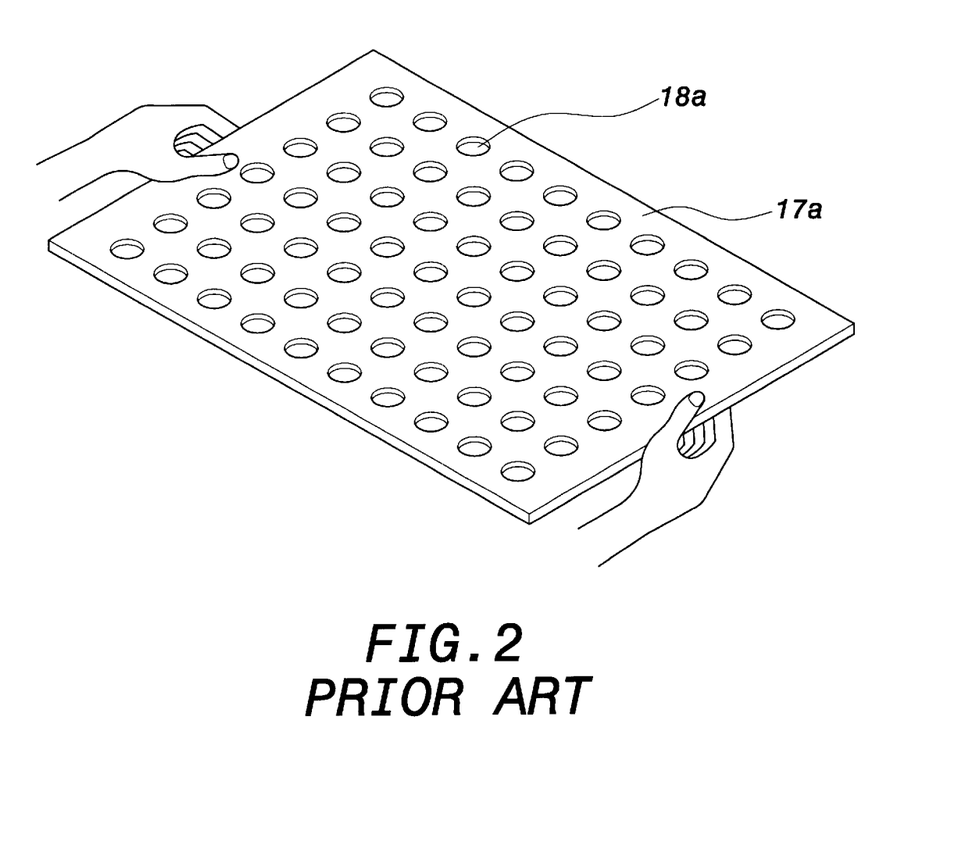
FIG. 2 is a diagram showing the prior art assembling method of rubber cones of a computer keyboard.

In the prior art, a moldboard 17a (shown in FIG. 2) having a plurality of recesses 18a is provided. The plurality of recesses 18a correspond to the key switches of a notebook computer keyboard. When a workpeople places a large quantities of rubber cones 12a on the surface of the moldboard 17a and then rocks the moldboard 17a to an fro with both hands, the rubber cones 12a will jump and fall into the recesses 18a of the moldboard 17a. This method is commonly used in the assembling procedure of desktop computer keyboards. However, because the sizes of notebook computers become more and more compact, the above method cannot assure that all the recesses 18a will be filled. The non-filled recesses 18a need to be filled manually.

The conventional method has the following drawbacks. First, because a workpeople only rocks a moldboard each time, the assembly efficiency is very low. Second, because the assembling procedure totally relies on manpower, the cost will be considerable, and economy cannot be enhanced.

SUMMARY OF THE INVENTION

The primary object of the present invention is to provide an assembling system of rubber cones of computer keyboards and an assembling method for the same, thereby partly automating the originally wholly-artificial assembling method, increasing assembly efficiency, and effectively enhancing economy.

To achieve the above object, the present invention provides an assembling system of rubber cones of computer keyboards and an assembling method for the same. The partly automated assembling system of rubber cones of computer keyboards of the present invention comprises an assembly housing, a moldboard stage, a rocking apparatus, and a rotating apparatus. The assembly housing has an operational space. The moldboard stage has a plurality of moldboard, and is arranged above the operational space of the assembly housing. Each moldboard corresponds to a keyboard to be assembled, and has a plurality of recesses corresponding to key switches of the keyboard on the surface thereof. The rocking apparatus and the rotating apparatus join with the moldboard stage at two sides thereof to provide required rocking and rotating forces for the moldboard.

The various objects and advantages of the present invention will be more readily understood from the following detailed description when read in conjunction with the appended drawings, in which:

DETAILED DESCRIPTION OF THE PREFERRED EMBODIMENTS

Figure 3:
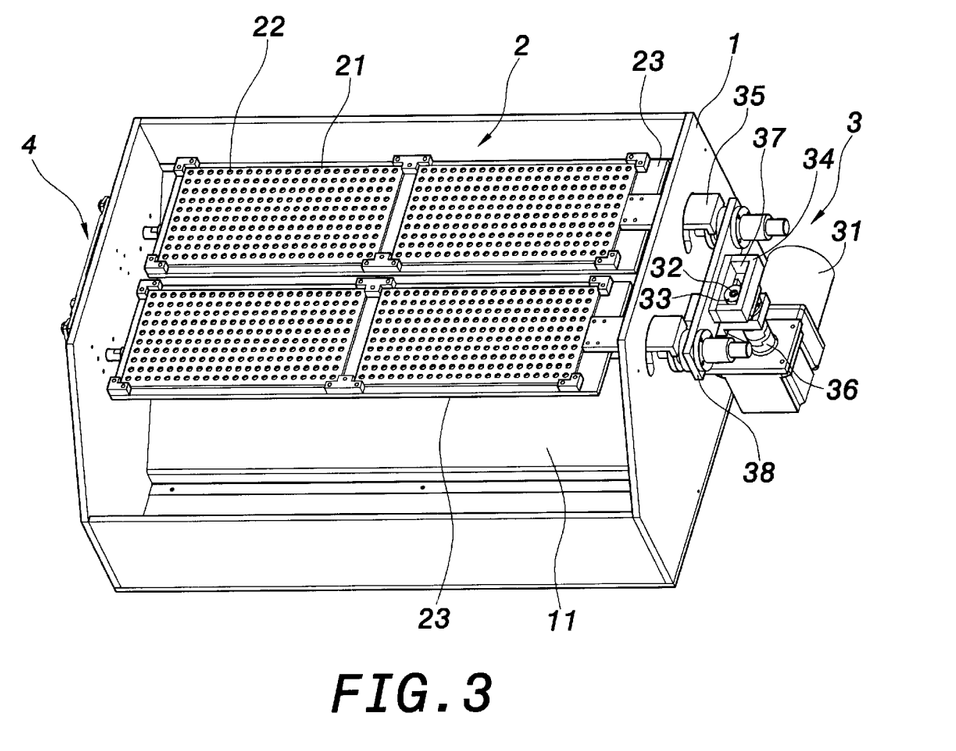
FIG. 3 is a perspective view of an assembling system of rubber cones of computer keyboards according to an embodiment of the present invention.
Figure 4:
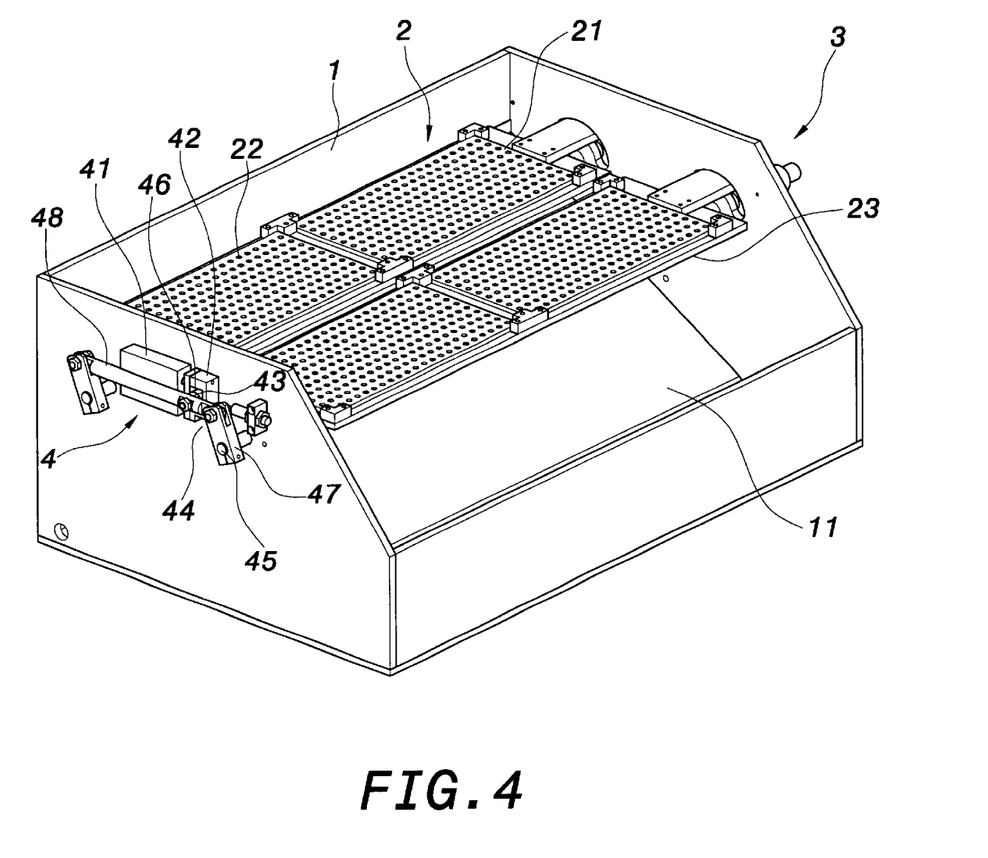
FIG. 4 is another perspective view of an assembling system of rubber cones of computer keyboards according to an embodiment of the present invention.

As shown in FIGS. 3 and 4, the present invention provides an assembling system of rubber cones of computer keyboards, especially a partly automated assembling system of rubber cones of computer keyboards, which system comprises an assembly housing 1, a moldboard stage 2, a rocking apparatus 3, and a rotating apparatus 4. The assembly housing 1 is a rectangular weighty housing, which can be placed on the ground or on the table, and has an operational space 11 therein.

The moldboard stage 2 has a plurality of moldboards 21. The embodiment of the present invention discloses a moldboard stage having four moldboards 21. The plurality of moldboards 21 are arranged above the operational space 11 of the assembly housing 1. The size of the moldboard 21 is about the same as that of a computer keyboard. The moldboard 21 has a plurality of recesses 22 on the surface thereof, each recess 22 corresponding to a key switch of the computer keyboard. Two moldboards 21 adjoining side by side are placed on a base 23. Each of the moldboards 21 corresponds to a keyboard to be assembled.

Figure 5:
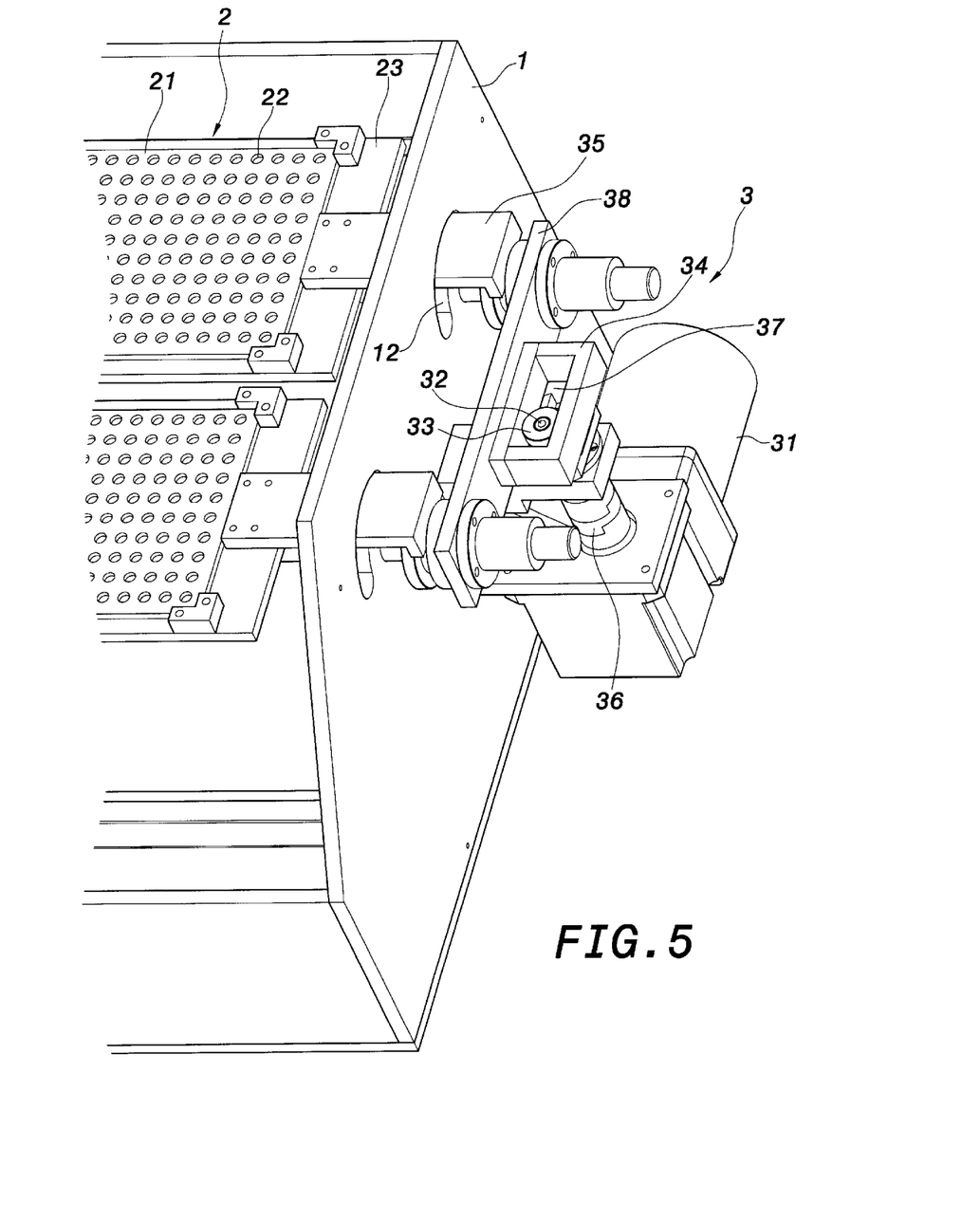
FIG. 5 is an enlarged view of the rocking apparatus of the present invention.
Figure 7:
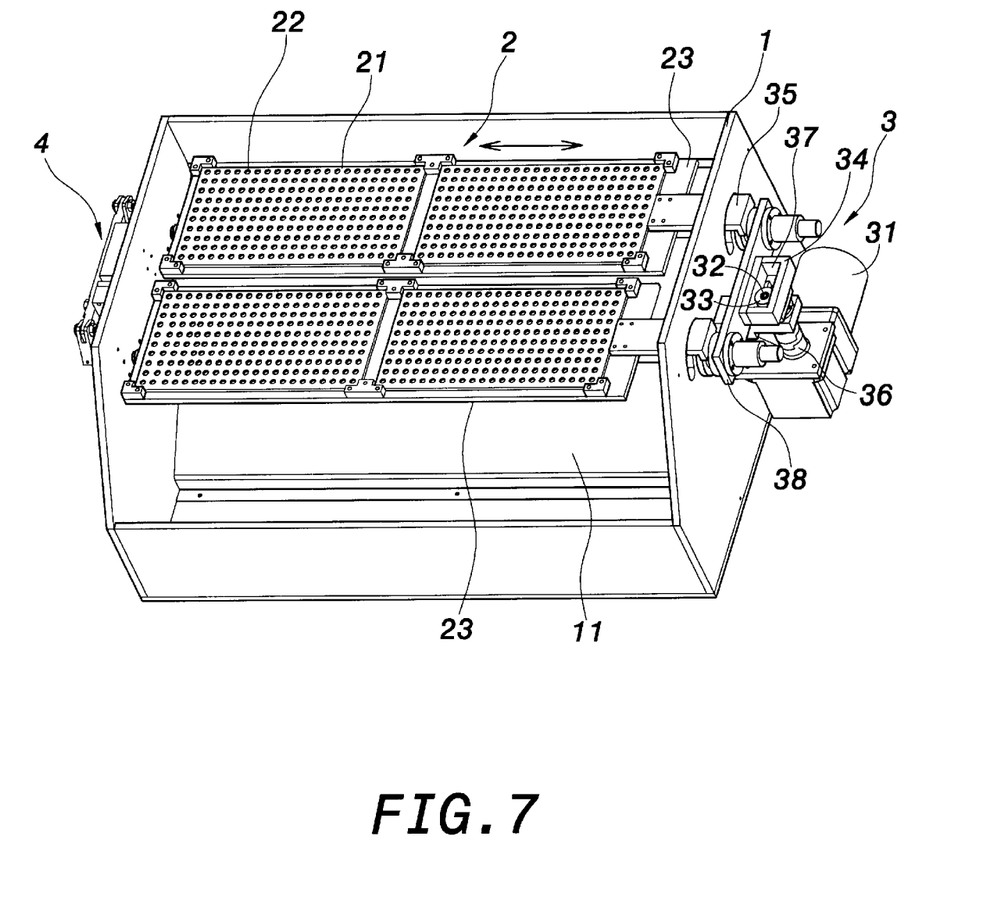
FIG. 7 is a diagram showing the activation state of the rocking apparatus of the present invention.

The rocking apparatus 3 is arranged at one side of the assembly housing 1, as shown in FIG. 5. The rocking apparatus 3 comprises a power source 31, a driving shaft 32, an eccentric wheel 33, a guide seat 34, and two connectors 35. The power source 31 is a motor properly fixed at one side of the assembly housing 1. The power output shaft of the power source 31 is connected to the driving shaft 32 through a shaft coupler 36. The driving shaft 32 is vertically arranged. The eccentric wheel 33 is fixed at the top end of the driving shaft 32. The guide seat 34 has a guide groove 37 therein. The eccentric wheel 33 is matched in the guide groove 37 of the guide seat 34, which is connected to a coupled plate 38 at the side adjoining the assembly housing 1. The connector 35 is L-shaped. The two connectors 35 are fixed at the two ends of the coupled plate 38. One end of the two connectors 35 extends into the assembly housing 1 via an arc slot 12 preset at one side of the assembly housing 1. The other end of the two connectors 35 is fixedly locked at one side of the base 23 of the moldboard stage 2 so that the rocking apparatus 3 can join the moldboard stage 2 at one side thereof. When the power source 31 is driven, the driving shaft 32 will drive the eccentric wheel 33 to rotate so that the guide seat 34 and the connectors 35 will be driven to make left-and-right reciprocating motions. Thereby, a rocking force can be applied to the moldboard stage 2, as shown in FIG. 7.

Figure 6:
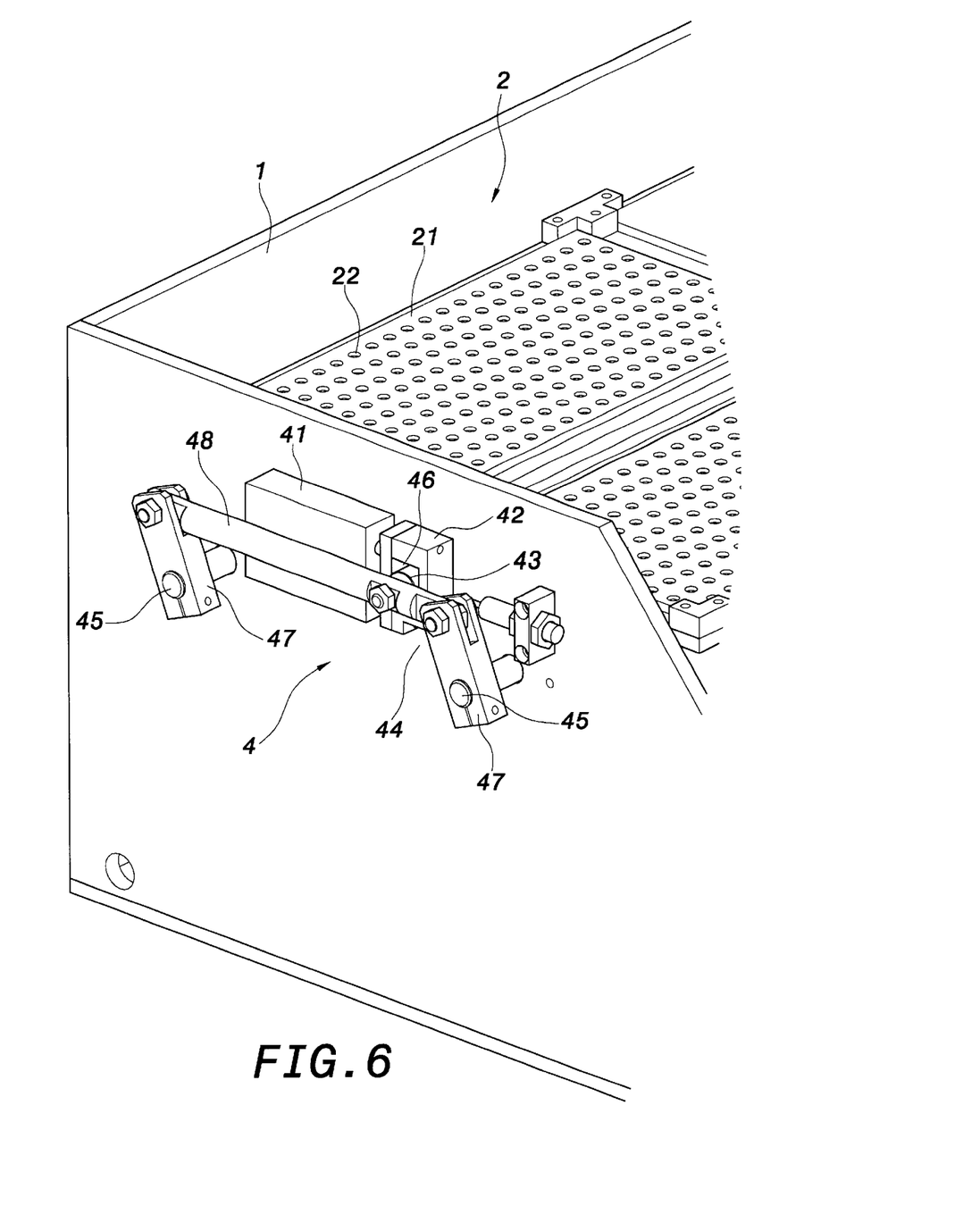
FIG. 6 is an enlarged view of the rotating apparatus of the present invention.
Figure 8:
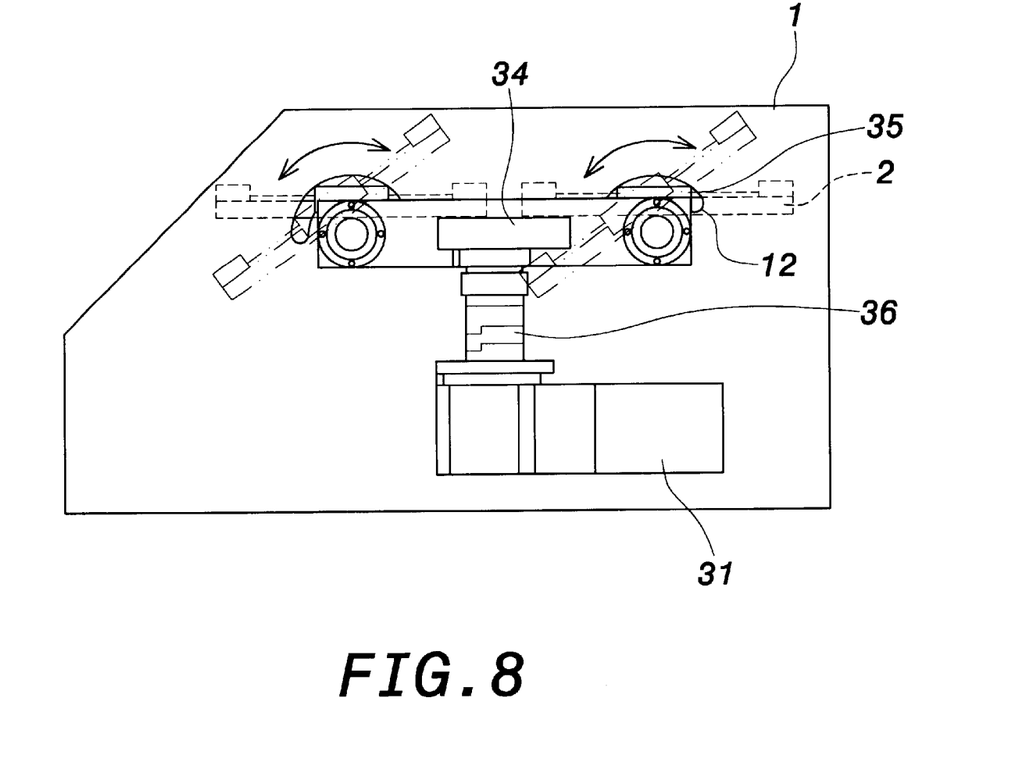
FIG. 8 is a diagram showing the activation state of the rotating apparatus of the present invention.

The rotating apparatus 4 is arranged at the other side of the assembly housing 1, as show in FIG. 6. The rotating apparatus 4 comprises a power source 41, a guide seat 42, a driving roller 43, a link mechanism 44, and two driving shafts 45. The power source 41 is a steam cylinder properly fixed at the other side of the assembly housing 1. The guide seat 42 is connected to the power output shaft of the power source 41, and has a guide groove 46 therein. The driving roller 43 is matched in the guide groove 46 of the guide seat 42. The link mechanism 44 is connected to the driving roller 43. The link mechanism 44 is a parallel-crank four-link mechanism comprising two cranks 47 and a link 48. Two ends of the link 48 are connected to the top ends of the two cranks 47, respectively. The bottom ends of the two cranks 47 are connected to the two driving shafts 45, respectively. The two driving shafts 45 penetrate through two sides of the assembly housing 1 so that they can be pivotally arranged on the assembly housing 1. The two bases 23 of the moldboard stage 2 are fixed on the two driving shafts 45 so that the rotating apparatus 4 can join the moldboard stage 2 at one side thereof When the power source 41 is driven, the guide seat 42 will drive the driving roller 43 so that the link 48 will make back-and-forth reciprocating motions. Therefore, the cranks 47 will make back-and-forth swing motions so that the driving shafts 45 will make clockwise and counterclockwise reciprocating rotations. Thereby, a rotating force can be applied to the moldboard stage 2, as shown in FIG. 8. An assembling system of rubber cones of computer keyboards of the present invention is thus formed.

Using the assembling system of rubber cones of computer keyboards of the present invention, a workpeople can accomplish the assembly of rubber cones on four moldboards simultaneously. The operational procedures are described below with reference to FIG. 9.

Figure 9:
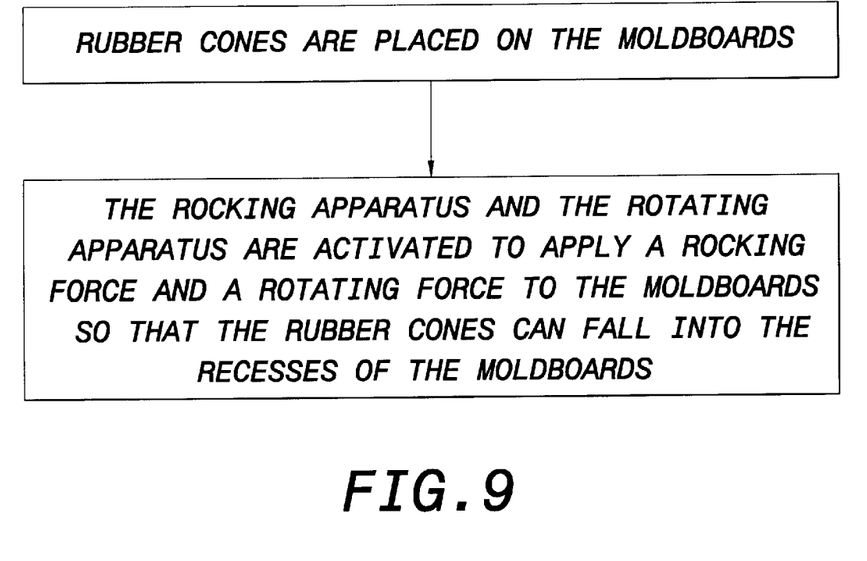
FIG. 9 is a flowchart of the operational procedures of the assembling method of rubber cones of computer keyboards of the present invention.

(1). First, the workpeople must place sufficient rubber cones on the four moldboards 21.

(2). Next, the rocking apparatus 3 and the rotating apparatus 4 are activated to guide the rubber cones into the recesses 22 of the moldboards 21. Generally, in the assembly process, the rocking apparatus 3 first runs a period of time until most of the rubber cones are guided into the recesses 22 of the moldboards 21, the rotating apparatus 4 is then activated to tilt the moldboard stage 2 an angle so as to remove excess rubber cones.

The assembling method of rubber cones of computer keyboards of the present invention applies a rocking force and a rotating force to the moldboard stage through the rocking apparatus and the rotating apparatus joining the moldboard stage, thereby partly automating the originally wholly-artificial assembling method, increasing assembly efficiency, and effectively enhancing economy.

To sum up, the present invention can partly automate the originally wholly-artificial assembling method of rubber cones of computer keyboards, enhance the assembly efficiency, and reduce the cost of manpower.

Although the present invention has been described with reference to the preferred embodiments thereof, it will be understood that the invention is not limited to the details thereof. Various substitutions and modifications have been suggested in the foregoing description, and others will occur to those of ordinary skill in the art. Therefore, all such substitutions and modifications are intended to be embraced within the scope of the invention as defined in the appended claims.

We claim:

1. An assembling system of rubber cones of computer keyboards, comprising:

an assembly housing having an operational space defined therein;

a plurality of moldboards, each having a plurality of recesses formed on the surface thereof, each of said recesses to be filled with a rubber cone;

a moldboard stage, said plurality of moldboards being arranged on said moldboard stage above the operational space of said assembly housing;

a rocking apparatus arranged on said assembly housing and joining said moldboard stage, said rocking apparatus automatically applying a rocking force to said moldboard stage to force said rubber cones to fall into said recesses; and a rotating apparatus arranged on said assembly housing and joining said moldboard stage, said rotating apparatus automatically applying a rotating force to said moldboard stage to remove rubber cones extraneous to said recesses from the surface of said moldboards.

2. The assembling system of rubber cones of computer keyboards as claimed in claim 1, wherein the size of said moldboard is comparable with that of a computer keyboard.

3. The assembling system of rubber cones of computer keyboards as claimed in claim 1, further comprising a base, wherein each two of said moldboards adjoining side by side are placed on said base, and said rocking apparatus is connected to one side of said base of said moldboard stage.

4. The assembling system of rubber cones of computer keyboards as claimed in claim 1, wherein said rocking apparatus is arranged at one side of said assembly housing, and said rotating apparatus is arranged at the other side of said assembly housing.

5. An assembling system of rubber cones of computer keyboards, comprising:

an assembly housing having an operational space;

a plurality of moldboards, each having a plurality of recesses formed on the surface thereof moldboard stage, said plurality of moldboards being arranged on said moldboard stage above said operational space of said assembly housing;

a rocking apparatus arranged on said assembly housing and operationally coupled to said moldboard stage, said rocking apparatus applying a rocking force to said moldboard stage; and a rotating apparatus arranged on said assembly housing and operationally coupled to said moldboard stage, said rotating apparatus applying a rotating force to said moldboard stage, wherein said rocking apparatus comprises a power source, a driving shaft, an eccentric wheel, a guide seat, and two connectors, said power source being fixed on said assembly housing and connected to said driving shaft through a shaft coupler, said eccentric wheel being fixed at one end of said driving shaft, said guide seat having a guide groove therein, said eccentric wheel being matched in said guide groove of said guide seat, one side of said guide seat being connected to a coupled plate, said connectors being fixed on said coupled plate and extending into said assembly housing said connectors joining said moldboard stage, thereby coupling said rocking apparatus to said moldboard stage.

6. An assembling system of rubber cones of computer keyboards, comprising:

an assembly housing having an operational space;

a plurality of moldboards, each having a plurality of recesses formed on the surface thereof;

a moldboard stage, said rocking apparatus applying a rocking force to said moldboard stage; and, a rotating apparatus arranged on said assembly housing and operationally coupled to said moldboard stage, said plurality of moldboards being arranged on said moldboard stage above the operational space of said assembly housing;

a rocking apparatus arranged on said assembly housing and operationally coupled to said moldboard stage, said rotating apparatus applying a rotating force to said moldboard stage, wherein said rotating apparatus comprises a power source, a guide seat having a guide groove formed therein, a driving roller, a link mechanism, and two driving shafts, said power source being fixed on said assembly housing, said guide seat being connected to said power source, said driving roller engaging in said guide groove of said guide seat, said link mechanism being connected to said driving roller and comprising two cranks and a link, one end of each of said two cranks being connected to a respective one of said driving shafts, said driving shafts being pivotally arranged on said assembly housing, and said moldboard stage being fixed on said driving shafts, thereby coupling said rotating apparatus to said moldboard stage.

* * * * *